United States Patent [19]
McTargett et al.

[11] Patent Number: 5,093,959
[45] Date of Patent: Mar. 10, 1992

[54] FAUCET HANDLE ASSEMBLY

[75] Inventors: Charles W. McTargett; Franco Perin, both of Indianapolis, Ind.

[73] Assignee: Masco Corporation of Indiana, Taylor, Mich.

[21] Appl. No.: 642,622

[22] Filed: Jan. 17, 1991

[51] Int. Cl.⁵ ............................................. F16K 31/60
[52] U.S. Cl. ..................... 16/121; 16/114 R; 16/DIG. 24; 16/DIG. 41; 74/548
[58] Field of Search ................. 16/117, 121, DIG. 24, 16/DIG. 30, DIG. 41, 114 R; 251/292; 74/552, 553, 548, 558

[56]  References Cited
U.S. PATENT DOCUMENTS

| | | | |
|---|---|---|---|
| 3,301,580 | 1/1967 | Greitzer | 16/DIG. 30 |
| 3,396,604 | 8/1968 | Samuels et al. | 16/DIG. 30 |
| 3,541,882 | 11/1970 | Testa | 16/121 |
| 4,593,430 | 6/1986 | Spangler | 16/DIG. 24 |

Primary Examiner—Robert L. Spruill
Assistant Examiner—D. M. Gurley
Attorney, Agent, or Firm—Myron B. Kapustij; Malcolm L. Sutherland

[57] ABSTRACT

A handle assembly for attaching a decorative handle to a turning stem is disclosed. The handle assembly comprises a handle body having a side wall and a top wall defining a hollow interior open at the bottom. A shaped aperture extends through the top wall of the handle body and is in communication with the hollow interior. An insert having a top portion and a shaped body portion of cross-sectional configuration, such as octagonal cross-section, complementary to the cross-sectional configuration of the shaped aperture extending through the top wall of the handle body is press-fit into the aperture with a section of the shaped body portion extending above the aperture. A decorative ring is disposed on top of the handle body. The ring has a shaped opening extending therethrough. The shaped opening is of a cross-sectional configuration, such as octagonal cross-section, complementary to the cross-sectional configuration of the section of the shaped body portion extending above the aperture in the top wall of the handle body. The section of the shaped body portion extending above the aperture is press-fit into the shaped opening in the ring. The insert is non-rotatably secured by a fastener to a faucet stem disposed in the hollow interior of the handle body. A cap, disposed on top of the ring, is secured to the top portion of the insert.

6 Claims, 1 Drawing Sheet

FAUCET HANDLE ASSEMBLY

FIELD OF THE INVENTION

This invention relates to decorative handles which are attachable to control stems such as those found in plumbing fixtures.

BACKGROUND OF THE INVENTION

Generally, in conventional handles for valve stems such as faucet valve stems an internally threaded bore is provided in the stem along with a set of external splines. A conventional handle contains a corresponding set of splines which mate with the stem spline and slide over them. An attachment screw in the handle secures the handle to the stem by threadably engaging the internally threaded bore in the stem. To make the attachment screw accessible so that the handle may be readily installed and removed, an access aperture is normally provided in the top of the handle to expose the attachment screw.

This type of arrangement has several disadvantages. Firstly, the access aperture detracts from the decorative appearance of the top of the handle. To remedy this disadvantage special removable snaps or covers were developed which can be placed over the access aperture. However, the use of these snaps or covers still detracts from the decorative appearance of the top of the handle and is also expensive.

Secondly, water leakage through the valve results in rusting of the attachment screw and, if the handle is made of a metal or alloy susceptible to rust, of the handle. This rusting presents difficulties in removal of the attachment screw when it is desired to remove the handle from the stem.

The instant invention remedies these disadvantages and provides an inexpensive, relatively simply designed handle assembly capable of connecting a decorative handle to a valve stem.

SUMMARY OF THE INVENTION

In accordance with the instant invention there is provided a decorative handle assembly for attachment to valve stems such as faucet valve stems. The handle assembly comprises a generally metallic or metallic alloy, e.g., brass, handle body having a longitudinally extending side wall and a flat top wall which together define a hollow interior open at the bottom. The top wall has an aperture extending therethrough in communication with the hollow interior. The aperture is of a non-circular cross-sectional configuration. An insert, comprised of a plastic material, having a body portion of a non-circular cross-sectional configuration complementary to the cross-sectional configuration of the aperture is inserted upwardly into the hollow interior of the handle body through the open bottom. The body of the insert is press-fit into the aperture in the top wall of the handle body. A section of the insert body portion protrudes through the aperture and extends above the top wall of the handle body. A decorative ring having an opening of a non-circular cross-sectional configuration complementary to the cross-sectional configuration of the section of the insert body portion protruding through the aperture is press-fit over said protruding section of the insert body portion. With the ring press-fit onto said protruding section of the insert body portion, the bottom surface of the ring abuts against the flat top wall of the body handle. A threaded fastener extends through a passage extending longitudinally through the insert and secures the insert to the stem by threadably engaging an internally threaded bore in the stem. The lower section of the passage has a cross-sectional configuration complementary to the cross-sectional configuration of the stem which is at least partially disposed in said passage, thereby securing the insert against rotation relative to the stem. A cap is secured to the insert by means of an internally threaded boss on the underside of the cap threadably engaging an externally threaded neck portion extending longitudinally from the top of the body portion of the insert. With the cap in place the decorative ring is sandwiched between the cap and the handle body.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
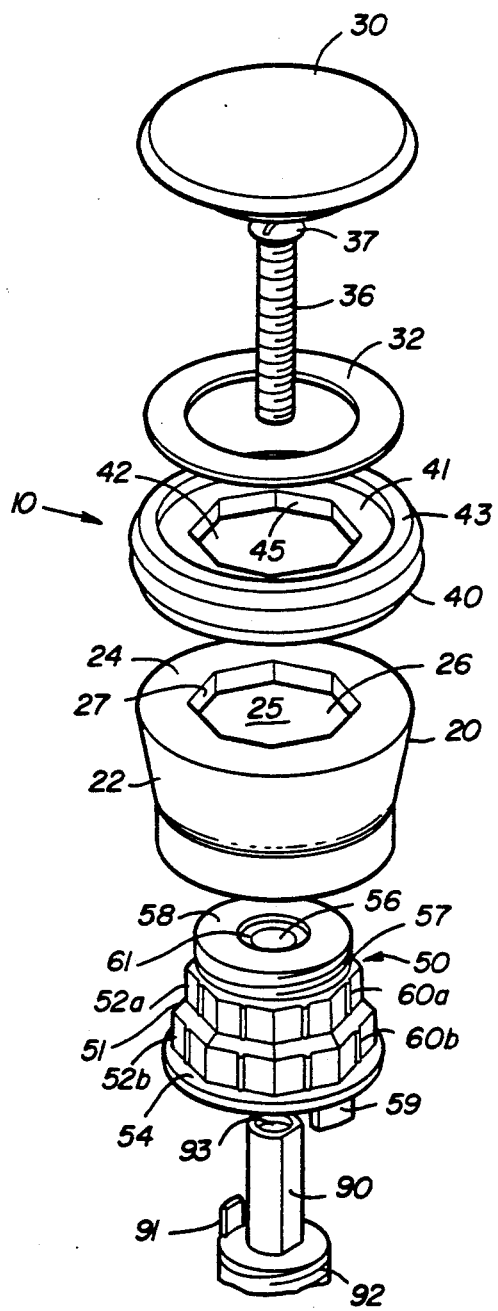
FIG. 1 is an exploded perspective view of the faucet handle assembly of the instant invention illustrating one embodiment thereof.

Referring to the drawings, the faucet handle assembly 10 comprises a handle body 20, a top 30 for said handle body 20, a decorative ring 40 interposed between the top 30 and handle body 20, and an insert 50 press-fitting in faucet handle body 20.

Handle body 20 includes side wall 22 and top wall 24 defining a cavity 25 which is open at the bottom. Top wall 24 has an aperture 26 defined by walls 27 extending therethrough and communicating with cavity 25. Aperture 26 is non-circular, preferably polygonal in cross-section. In the structure illustrated in FIGS. 1 and 2 the aperture 26 is octagonal in transverse cross-section.

An insert 50, made of a hard plastic material such as, for example, nylon, acetal, and the like is press-fit into aperture 26. The body portion 51 of the insert 50 has a cross-sectional shape corresponding to that of aperture 26. Thus, in the embodiment illustrated in FIG. 1 the body 51 of insert 50 has an octagonal cross-section which is complementary to the octagonal cross-sectional configuration of aperture 26. In the embodiment illustrated in FIG. 4 body portion 101 of insert 100 has a square transverse cross-sectional configuration. This square body portion would be press-fit within a corresponding square shaped aperture in the top wall of the handle body.

Figure 2:
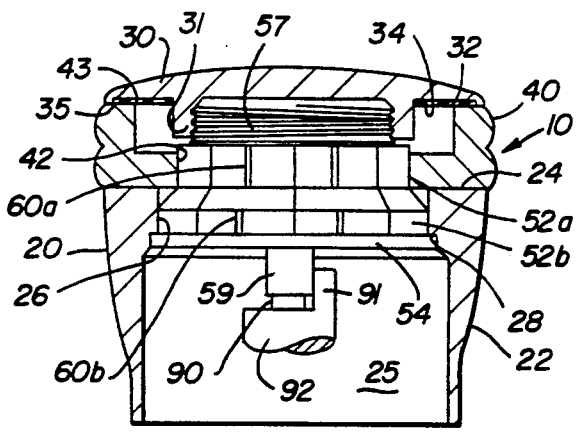
FIG. 2 is a side elevational view in section of the embodiment shown in FIG. 1.
Figure 4:
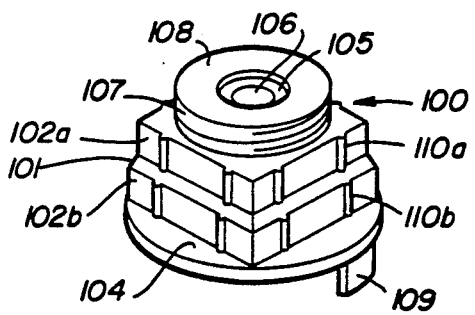
FIG. 4 is a perspective view illustrating the insert of yet another embodiment of the faucet handle assembly of the instant invention.

In the embodiment illustrated in FIGS. 1, 2 and 4 body portions 51 and 101 of inserts 50 and 100, respectively, are comprised of two sections, a larger in cross-section polygonal shaped lower section 52b (102b in FIG. 4) and a smaller in cross-section polygonal shaped upper section 52a (102a in FIG. 4). Both the upper section 52a (102a in FIG. 4) and lower section 52b (102b in FIG. 4) have crush ribs 60a and 60b (110a and 110b), respectively, extending vertically or axially down the face of each polygonal surface.

As illustrated in FIG. 2 the lower sections 52b of body portion 51 is press-fit into aperture 26 of handle body 20. Upon insertion of lower section 52b into aperture 26 the crush ribs 60b are deformed by the side wall 27 defining aperture 26. The deformed crush ribs 60b insure a tight and secure fit of lower section 52b of body portion 51 within aperture 26.

Upper section 52a of body portion 51 is press-fit into aperture 42 extending through top wall 41 of ring 40. Aperture 42 corresponds in size and shape to upper section 52a of body portion 51. The crush ribs 60a are also deformed by side wall 45 defining aperture 42 thereby insuring a tight and secure fit of upper section 52a within aperture 42.

In the embodiments illustrated in FIGS. 1, 2 and 4 aperture 42 is smaller than aperture 26 and corresponds in size and shape to smaller upper section 52a of body portion 51 while aperture 26 corresponds in size and shape to larger lower sections 52b of body portion 51. This arrangement allows the smaller upper sections 52a of body portion 51 to pass freely through aperture 26 without having the crush ribs 60a deformed by the side walls 27 defining aperture 26. Crush ribs 60a of upper section 52a are deformed only by side wall 45 defining aperture 42 in ring 40 when upper section 52a of body portion 51 is press-fit into aperture 42.

Figure 3:
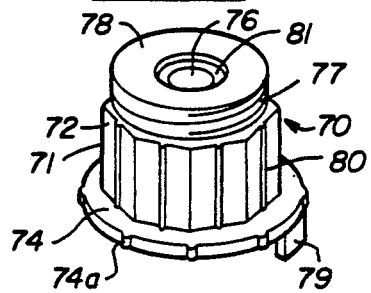
FIG. 3 is a perspective view illustrating the insert of another embodiment of the faucet handle assembly of the instant invention.

It is of course possible, as shown by the embodiment in FIG. 3, for the body portion 71 of insert 70 to be of uniform size, i.e., not have a smaller upper section and a larger lower section as in the embodiments illustrated in FIGS. 1, 2 and 4. In such case the aperture 42 in ring 40 and aperture 26 in handle body 20 will be of the same size and shape corresponding to the size and shape of body portion 71. While in the embodiment illustrated in FIG. 3 there will be deformation of crush ribs 80 by side wall 27 defining aperture 26 upon passage of upper part of body portion 71 through aperture 26, the thus deformed crush ribs 80 in the upper part of body portion 71 disposed in aperture 42 will still provide a sufficiently tight and secure press-fit of said upper part of body portion 71 within aperture 42.

Body portion 51 of insert 50 is inserted into aperture 26 from the bottom of handle body 20 by inserting insert 50 upwardly through the open bottom of handle body 20. The interior of handle body 20 has a circumferentially extending inner shoulder 28 adjacent aperture 26. Radially extending rim 54 on the bottom of insert 50, which rim 54 has a larger outer diameter than the diameter of aperture 26, abuts against inner shoulder 28 thereby preventing the insert 50 from exiting upwardly through aperture 26.

Figure 5:
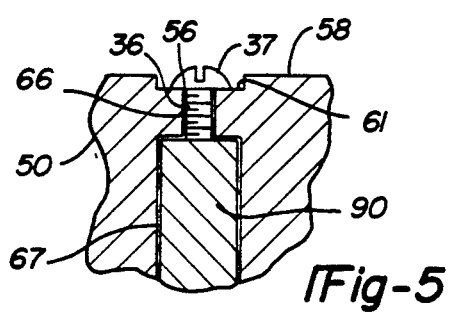
FIG. 5 is a partially sectioned side elevational view showing the passageway extending longitudinally through the center of the insert adapted to receive a threaded fastener which secures the insert to the stem in its top section and the stem in its bottom section.

Insert 50 has an externally threaded neck 57 on top of body portion 51. As best seen in FIG. 5 a passageway 56 extends through the top flat surface 58 of neck 57 and longitudinally through insert 50. Passageway 56 has two different sections of different cross-sectional shape and size. The top section 66 of the passageway, which receives threaded securing member 36, is generally of a circular cross-section and of a size adapted to receive threaded member 36. It generally has a greater diameter than the outer diameter of the shaft of threaded member 36 so that threaded member 36 may rotate freely therein. Bottom section 67 of passageway 56, which receives valve stem 90, is of asymmetrical cross-section so as to correspond to the asymmetrical cross-sectional shape of valve stem 90. Valve stem 90 is thus affixed against rotation relative to insert 50 within the bottom section 67 of passageway 56. Rotation of insert 50 will thus cause rotation of stem 90.

Threaded fastener 36 secures insert 50 against longitudinal or axial movement relative to stem 90 by threadably engaging the internally threaded axial bore 93 in faucet stem 90. Head 37 of threaded member 36 has a diameter greater than passageway 56 and is seated in recessed seat 61 in flat top surface 58.

A cap 30 is secured to insert 50 to conceal threaded fastener 36 and to additionally secure ring 40 against longitudinal movement relative to insert 50. Cap 30 is secured to insert 50 by means of internally threaded boss 31 disposed on the underside of cap 30 threadably engaging externally threaded neck 57 of insert 50. With cap 30 secured to insert 50 radially outer portion 35 of the underside of cap 30 abuts against radially outer circumferentially extending raised portion 43 of ring 40, thereby forcing ring 43 downwardly to abut against flat top surface 24 of handle body 20.

As best seen in FIG. 2 a washer 32 is disposed in annular recess 34 in the underside of cap 30 to form a water-tight seal between the underside of washer 32 and the top flat surface 43 of ring 40. With cap 30 secured to insert 50, ring 40 is sandwiched between cap 30 and handle body 20.

Rotation of handle body 20 or ring 40 will cause rotation of insert 50, and corresponding rotation of the stem. A stop 59 depends downwardly from insert 50. Stop 59 is adapted to engage complementary stop 91 extending upwardly from fixed bushing 92 thereby limiting rotation of stem 90 by handle assembly 10 and preventing over-rotation.

The cap 30, ring 40 and handle body 20 may all be comprised of the same metal or metal alloy, e.g., brass. Alternatively, the cap 30 and/or ring 40 may be comprised of a metal or metal alloy different from; or differently colored or plated than, handle body 20. Furthermore, either the ring or the handle, or both, may be comprised of or coated with a plastic material, e.g., an elastomeric material, so as to provide a non-slip surface.

The features of the embodiment illustrated in FIG. 4 identified by reference numerals 104, 105, 106, 107, 108, 109, 110a and 110b correspond in structure and function to features of the embodiment illustrated in FIG. 1 identified by reference numerals 54, 61, 56, 57, 58, 59, 60a and 60b respectively. Likewise, the features of the embodiment illustrated in FIG. 3 identified by reference numerals 74, 76, 77, 78, 81 and 79 correspond in structure and function to the features of the embodiment illustrated in FIG. 1 identified by reference numerals 54, 56, 57, 58, 61 and 59 respectively. Reference numeral 80 in FIG. 3 refers to crush ribs disposed on the faces of the polygonal shaped body portion 71, while reference numeral 74a identifies crush ribs disposed on the rim of member 74.

Other modifications can be made to those which have been described in the text and illustrated in the figures by way of example without departing from the scope of the instant invention.

What is claimed is:
1. A faucet handle assembly comprising:
 a handle body comprising a top laterally extending wall and a downwardly depending side wall to- gether defining a hollow interior open at the bottom;

an aperture extending through said top wall, said aperture having a non-circular cross-sectional configuration;

a plastic insert disposed in said hollow interior of said handle body comprising a body portion having a lower section and an upper section, said body portion having a non-circular cross-sectional configuration complementary to the cross-sectional configuration of said aperture, wherein the lower section of said body portion is adapted to be press-fit into said aperture with the upper section of said body portion protruding through said aperture and extending beyond the top wall of said handle body;

a ring member having an opening extending therethrough, said opening having a non-circular cross-sectional configuration complementary to the cross-sectional configuration of the upper section of said body portion of the insert and adapted to be press-fit over said upper section of said body portion;

means for securing said insert to a valve stem which is at least partially disposed within said hollow interior of said handle body;

a cap; and means for securing said cap to said insert, whereby when said cap is secured to said insert the ring member is disposed intermediate said cap and top wall of said handle body.

2. The faucet handle assembly according to claim 1 wherein said aperture extending through said top wall of said handle body, said body portion of said insert, and said opening extending through said ring member have a polygonal cross-sectional configuration.

3. The faucet handle assembly according to claim 2 wherein said polygonal cross-sectional configuration is an octagonal cross-sectional configuration.

4. The faucet handle assembly according to claim 2 wherein a longitudinally extending raised crush rib is disposed on at least one face of said polygonal body portion.

5. The faucet handle assembly according to claim 2 wherein said upper section of said body portion has a smaller cross-sectional size than said lower section of said body portion, and wherein said opening in said ring has a smaller cross-sectional size than said aperture extending through said top wall of said handle body, whereby said upper section of said body portion is adapted to be press-fit into said opening in said ring while said lower section of said body portion is adapted to be press-fit into said aperture extending through the top wall of said handle body.

6. The faucet handle assembly according to claim 1 wherein said means for securing said cap to said insert comprise an internally threaded boss depending downwardly from the underside of said cap adapted to threadably engage an externally threaded neck extending upwardly from the top section of the body portion of said insert.

* * * * *